United States Patent

Schwaegerl et al.

(10) Patent No.: US 9,604,285 B2
(45) Date of Patent: Mar. 28, 2017

(54) ROTARY TOOL AND METHOD FOR MANUFACTURING

(71) Applicant: KENNAMETAL, INC., Latrobe, PA (US)

(72) Inventors: Juergen Schwaegerl, Vohenstrauss (DE); Herbert Rudolf Kauper, Erlangen (DE)

(73) Assignee: KENNAMETAL, INC., Latrobe, PA (US)

( * ) Notice: Subject to any disclaimer, the term of this patent is extended or adjusted under 35 U.S.C. 154(b) by 0 days.

(21) Appl. No.: 14/644,635

(22) Filed: Mar. 11, 2015

(65) Prior Publication Data

US 2016/0263663 A1 Sep. 15, 2016

(30) Foreign Application Priority Data

Mar. 13, 2014 (DE) .................. 10 2014 204 700

(51) Int. Cl.
*B23B 51/02* (2006.01)
*B24B 3/26* (2006.01)

(52) U.S. Cl.
CPC ............... *B23B 51/02* (2013.01); *B24B 3/26* (2013.01); *B23B 2251/04* (2013.01); *B23B 2251/18* (2013.01); *Y10T 408/906* (2015.01)

(58) Field of Classification Search
CPC . B23B 51/02; B23B 2251/04; B23B 2251/18; B24B 3/26; Y10T 408/906
See application file for complete search history.

(56) References Cited

U.S. PATENT DOCUMENTS

| | | | |
|---|---|---|---|
| 3,387,511 A | 6/1968 | Ackart, Sr. et al. | |
| 3,443,459 A | 5/1969 | Mackey et al. | |
| 3,626,645 A | 12/1971 | Rochet | |
| 3,779,664 A * | 12/1973 | Caley | B23B 51/02 408/225 |
| 4,080,093 A | 3/1978 | Maier | |
| 4,561,813 A * | 12/1985 | Schneider | B23B 51/02 408/228 |
| 4,759,667 A | 7/1988 | Brown | |
| 4,878,788 A * | 11/1989 | Wakihira | B23B 51/02 408/199 |

(Continued)

FOREIGN PATENT DOCUMENTS

| | | | |
|---|---|---|---|
| DE | 2352320 A1 | 5/1974 | |
| DE | 2454964 A1 * | 6/1976 | ............... B24B 3/26 |

(Continued)

OTHER PUBLICATIONS

Aug. 10, 2015 Search report 151585254.

*Primary Examiner* — Eric A Gates
*Assistant Examiner* — Donte Brown
(74) *Attorney, Agent, or Firm* — Ian K. Samways

(57) ABSTRACT

A rotary tool, in particular drilling tool, extends along a longitudinal axis and has an end surface; a brad point; and at least one major cutting edge extending outward up to an edge corner. A first free surface segment adjoins the major cutting edge, and a second free surface segment in turn adjoins said first free surface segment. To keep the stress, in particular the wear, low in the region of the end surface, the first free surface segment has a lower average abrasiveness than the second free surface segment.

20 Claims, 1 Drawing Sheet

(56) References Cited

U.S. PATENT DOCUMENTS

| | | | | |
|---|---|---|---|---|
| 4,968,193 A | * | 11/1990 | Chaconas | B23B 51/02 408/211 |
| 4,983,079 A | | 1/1991 | Imanaga et al. | |
| 5,056,967 A | * | 10/1991 | Hageman | B23B 51/02 408/199 |
| 5,282,705 A | | 2/1994 | Shiga et al. | |
| 5,423,640 A | * | 6/1995 | Lindblom | B23B 51/02 408/227 |
| 5,618,028 A | * | 4/1997 | Hepworth | B24B 3/24 451/375 |
| 5,620,363 A | * | 4/1997 | Hepworth | B24B 3/24 451/231 |
| 5,980,169 A | * | 11/1999 | Hinch | B23B 51/02 408/211 |
| 6,988,859 B2 | * | 1/2006 | Borschert | B23B 51/02 408/230 |
| 7,516,686 B2 | * | 4/2009 | Wang | B23B 51/02 408/230 |
| 7,575,401 B1 | * | 8/2009 | Garrick | B23B 51/02 408/145 |
| 7,832,966 B2 | * | 11/2010 | Shultz | B23B 51/02 408/224 |
| 8,105,001 B2 | | 1/2012 | Krenzer et al. | |
| 8,292,555 B2 | * | 10/2012 | Shaffer | B23B 51/02 408/230 |
| 2002/0044843 A1 | | 4/2002 | Suzuki et al. | |
| 2007/0237594 A1 | | 10/2007 | Lang | |
| 2008/0019787 A1 | * | 1/2008 | Sampath | B23B 51/02 408/230 |
| 2010/0166517 A1 | | 7/2010 | Saito et al. | |
| 2012/0201619 A1 | * | 8/2012 | Olsson | B23B 51/02 408/230 |

FOREIGN PATENT DOCUMENTS

| | | | | |
|---|---|---|---|---|
| EP | 1 230 058 A1 | 8/2002 | | |
| WO | WO 2012072652 A1 | * | 6/2012 | B23B 51/02 |
| WO | WO2013190977 A1 | 12/2013 | | |
| WO | WO 2015025872 A1 | * | 2/2015 | B23B 51/02 |
| WO | WO 2015028431 A1 | * | 3/2015 | B23B 51/02 |

* cited by examiner

ROTARY TOOL AND METHOD FOR MANUFACTURING

BACKGROUND

Field of the Invention

The present invention relates to a rotary tool, and more particularly to a drilling tool, which extends along a longitudinal axis and has a front end surface with a brad point, with a first major cutting edge extending outward up to an outer edge corner; and with a first free surface segment adjoining the major cutting edge; and with a second free surface segment adjoining said first free surface segment. The present invention also relates to a method of making a rotary tool.

Background Information

A rotary tool upon which embodiments of the present invention improves is disclosed in U.S. Pat. No. 4,759,667, for example. Furthermore, a drilling tool having what is known as a four-surface ground section is also disclosed in U.S. Pat. No. 4,983,079.

The end surface of such drills having a multi-surface ground section typically has a first free surface segment adjoining the respective major cutting edge in the direction of rotation, said first free surface segment being oriented at a first clearance angle. Adjoining this is the second free surface segment which is oriented at a larger clearance angle. In the twist drill disclosed in U.S. Pat. No. 4,983,079, the first free surface segment runs along the entire major cutting edge. Two major cutting edges are thereby connected to one another via a chisel edge. To improve the cutting properties, according to U.S. Pat. No. 4,759,667 the first free surface segment is fashioned to be approximately triangular, with increasing width towards the circumference of the drilling tool. The first free surface segment begins not at the brad point, as is the case with conventional four-surface grinding, but rather radially distant from this point at the end of the chisel edge.

Owing to the edge fashioned by the grinding in the transition between the two free surface segments, mechanical stresses often occur at this edge. To avoid such mechanical stresses, a drill bit is fashioned—for example according to EP 1 230 058 B1—in which the free surface is fashioned as a surface without an edge, curving from the major cutting edge in the direction towards the flute.

SUMMARY OF THE INVENTION

Embodiments of the present invention solve the problem of specifying a rotary tool, in particular a drilling tool, with improved properties, in particular with one or more improved wear characteristics.

According to the present invention, the problem is solved by means of a rotary tool as well as a method for manufacturing such a rotary tool. The rotary tool, in particular a drilling tool, therein extends along a longitudinal axis and has a front end surface which comprises a brad point situated on the longitudinal axis. Along one edge of the end surface, a major cutting edge runs in roughly radial direction up to an outer edge corner of the drilling tool. At least two major cutting edges are typically fashioned that are connected with one another via a chisel edge. The chisel edge in this example traverses a drilling core of the rotary tool and crosses the brad point. Similar to the case of a conventional four-surface ground section, a first free surface segment adjoins the major edge in the circumferential direction, and a second free surface segment in turn adjoins this first free surface segment. The two free surface segments thus transition into one another. To reduce the cutting forces occurring in the cutting operation, it is now provided that the first free surface segment has a lower average abrasiveness in comparison to the second free surface segment. In terms of production, this is achieved according to the invention within the scope of the method in that the two free surface segments are ground with different abrasive discs, wherein the abrasive discs differ in particular with regard to their grit.

This embodiment is based on the consideration that, upon machining, large friction forces occur in the region of the first free surface segment immediately adjoining the major cutting edge, the large friction forces potentially leading to a high degree of wear, and overall to a high mechanical loading of the drilling tool. Fashioning the first free surface segment with an improved surface quality (i.e. a low abrasiveness) reduces the abrasive stress (and therefore the mechanical stress) as well as the wear specifically at this highly stressed point adjoining the major cutting edges.

It is advantageously provided that the average abrasiveness of the first free surface segment is less than $0.1$ μm. At the same time, the average abrasiveness of the second free surface segment is greater than $0.1$ μm, and in particular ranges between $0.1$ μm and $0.4$ μm. These abrasiveness values ensure on the one hand an economic manufacturing method in which sufficiently high grinding velocities are allowed, while at the same time ensuring a high surface quality of the first free surface segments. The grit of the different abrasive discs that are used is selected corresponding to these average abrasiveness values.

In a particularly preferred embodiment, the first free surface segment, as viewed in the radial direction, begins at a distance from the brad point, in particular adjoining the chisel edge. Through this measure, the particular advantage is achieved that a clearance angle associated with the first free surface segment may differ from a clearance angle in the region of the center, and these clearance angles may therefore be set independently of one another. With conventional grinding using an abrasive disc that typically extends beyond the total radial length, starting from the center, a decoupling of the clearance angle in the region proximal to the center from the clearance angle in the region distal to the center is typically not possible without further measures. In the region proximal to the center, a comparably large clearance angle is required in this case since, in the region proximal to the center, the end surface has a comparable height offset in the longitudinal direction (i.e. a large slope) per angle of rotation.

In another preferred embodiment, the first free surface segment first adjoins a center-distal region of the major cutting edge, i.e.—as viewed in a radial direction—is spaced apart from the chisel edge. In a center-proximal segment of the major cutting edge, the first free surface segment does not yet adjoin the major cutting edge. Viewed in a radial direction, the first free surface segment thus first begins in a middle region of the major cutting edge. The second free surface segment therefore generally at least immediately adjoins the chisel edge, and preferably also immediately adjoins a center-proximal sub-segment of the major cutting edge. The first free surface segment is therefore fashioned only in a radially outer region which, for example, covers the outer 50 to 90% of the radial extent of the major cutting edge.

As has already been noted, a decoupling of the clearance angle between the center-proximal region and the center-distal region is enabled.

Therefore, it is also provided that the end surface generally adjoins the major cutting edge at a clearance angle which is smaller in a center-distal region than in a center-proximal region of the end surface. In the center-distal region, the clearance angle is thereby defined by the first free surface segment. The first clearance angle defined by the first free surface segment thereby typically ranges between 5 and 10°, for example.

According to a preferred refinement, the first free surface segment in the circumferential direction has a width that increases in the direction towards the edge corner. Overall, the first free surface segment has a shape that tapers towards the center.

Furthermore, in the region of the edge corner on the outer circumference, the first free surface segment extends over an angle ranging approximately between 5 and 20° in the rotation direction. This comparably short extension in the circumferential direction is sufficient for the sought wear-reducing effect.

As was already mentioned, according to the invention two abrasive discs of different grit are used to manufacture such a drilling tool, wherein the abrasive disc with the finer grit is used for the first free surface segment. The end face geometry of the drilling tool is initially ground with the abrasive disc with the coarser grit. The first free surface segment is subsequently ground in with the additional second abrasive disc in a separate grinding step.

BRIEF DESCRIPTION OF THE DRAWINGS

An exemplary embodiment of the invention is explained in detail below using figures, each of which shows, in simplified depictions.

DESCRIPTION OF THE PREFERRED EMBODIMENTS

Figure 1:
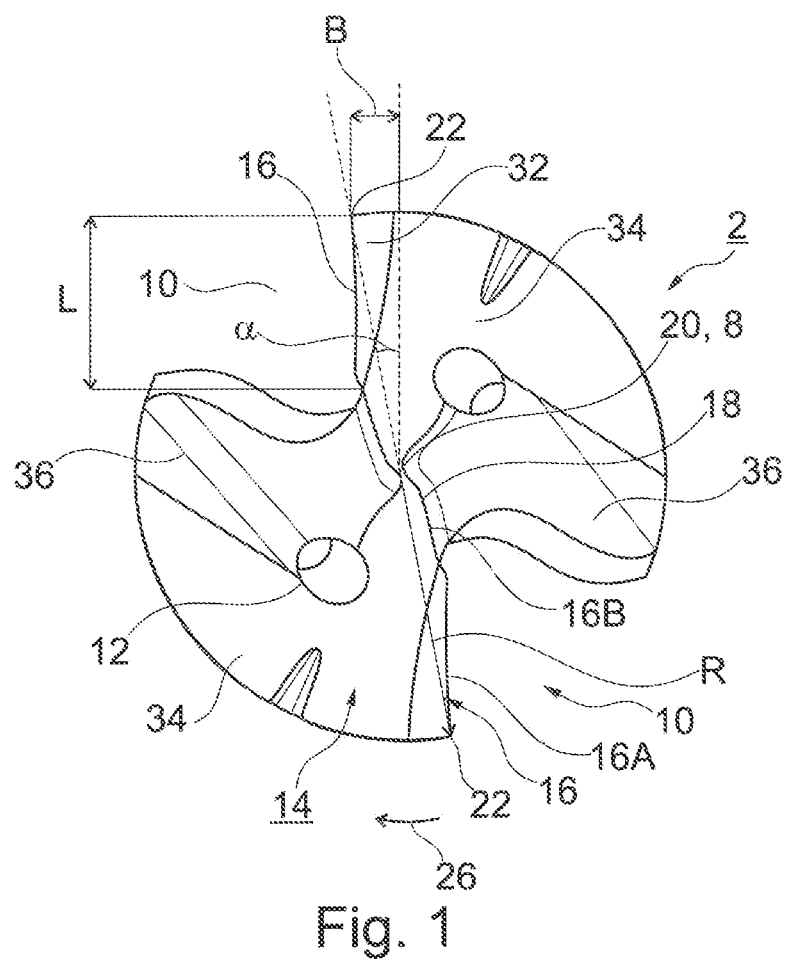
FIG. 1 an end view of a drill face of an interchangeable drill bit.
Figure 2:
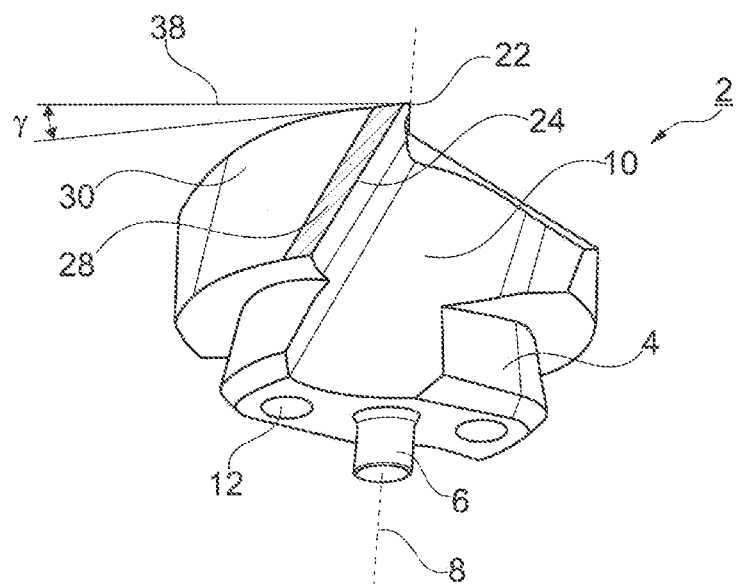
FIG. 2 a perspective side view of the interchangeable drill bit depicted in FIG. 1.

An exchangeable drill bit 2 is depicted here as an example in FIGS. 1 and 2, where said drill bit 2 can be inserted, in a manner not shown in detail, into a fluted base body to form a modular drilling tool. For this purpose the drill bit 2 comprises an attachment peg 4 with which it can be inserted into a corresponding receptacle of the base body where it can clamped and reversibly interchanged. A clamping attachment as well as a torque transfer take place via the attachment peg 4. An insertion peg 6 adjoins the attachment peg 4.

The drill bit 2 extends along a longitudinal axis 8 which simultaneously defines a rotation axis around which the drill bit 2 rotates during the operation. The drill bit 2 is designed with fluting and, in the exemplary embodiment, has two flutes 10 which are continued into the base body. Furthermore, in the exemplary embodiment coolant bores 12 are fashioned which penetrate the drill bit 2 in the longitudinal direction and exit at a front-facing end surface 14.

The drill bit 2 comprises two major cutting edges 16 which are connected with one another via a chisel bit 18. In the exemplary embodiment, the chisel bit 18 travels approximately in an S-shape. The chisel edge 18 hereby crosses a brad point 20 which lies on the longitudinal axis 8. The cutting edges, i.e. the chisel edge 18 as well as the major cutting edges 16, travel continuously from the brad point 20 up to an outer circumference of the drill bit 2, and without stepping along an edge of the end surface 14 that they form. The major cutting edges 16 end at an edge corner 22 on the outer circumferential edge. The distance from the brad point 20 to the edge corner 22 defines a nominal radius R of the drill bit 2. A minor cutting edge 24 adjoins the edge corner 22 on the circumference, the minor cutting edge 24 traveling along a flute 10. A support bevel 28 adjoins the minor cutting edge 24 in the circumferential direction 26. A drill back 30 is fashioned at the circumference between the flutes 10. The circumferential direction 26 is generally defined by the curve of a circular arc with the brad point 20 as a circle center.

In the exemplary embodiment, the end surface 14 is formed by a first free surface segment 32 as well as a second free surface segment 34 adjoining said first free surface segment 32 in the circumferential direction 26. Finally, what is known as a point thinning 36 is further ground into the drill bit 2 at the end face, the point thinning 36 removing material in a manner known per se in the region of the brad point 20 so that the center is tapered.

The first free surface segment 32 is oriented at a clearance angle γ relative to a horizontal plane 38, the clearance angle γ ranging between 5 and 10°. The second free surface segment 34 likewise has a clearance angle γ (not shown in detail here) which is somewhat larger than the clearance angle γ of the first free surface segment 32. The longitudinal axis 8 is perpendicular to the horizontal plane 38.

In the exemplary embodiment, the first free surface segment begins at a distance from the brad point 20 and extends from there up to the circumferential side of the drill bit 2. In the circumferential direction 26 it has a width B that increases in the direction towards the circumferential side, thus towards the edge corner 22. In the exemplary embodiment, the first free surface segment 32 is fashioned in a roughly triangle shape. For example, the width B at the edge corner 22 ranges between 10 and 20% of the nominal radius R. In general, the first free surface segment 32 covers an angle α ranging between 5 and 20° at the edge corner 22.

Furthermore, the first free surface segment 32 has a radial length L ranging between 50 and 90% of the nominal radius R, for example. The first free surface segment 32 thereby begins within the major cutting edge 16, spaced apart from the end of the chisel edge 18. The first free surface segment 32 is therefore fashioned only in the center-distal sub-segment 16A of the major cutting edge. At the same time, the second free surface segment 34 extends up to the chisel edge 18 in the center-proximal region and, in the exemplary embodiment, also extends up to a center-proximal inner sub-segment 16B of the major cutting edge 16. As viewed in the circumferential direction, in the exemplary embodiment the second free surface segment 34 transitions on the back side into the point thinning 36, which essentially represents a transition to the flute 10.

The two major cutting edges 16 are oriented approximately roof-like relative to one another at a point angle relative to one another. The point angle is generally ranges between 90 and 180 or 179°. It preferably lies approximately around 140°. Overall, the end surface 14 is formed in the manner of cone envelope segments.

In the region of the first free surface segment 32, the point angle is somewhat increased, for example by 1 to 5°, in particular by 1°, in comparison to an inner center-proximal region. The end surface 14 therefore travels towards the edge corner 22 somewhat flatter in an outer region, in particular in the region of the first free surface segment 32, than towards the brad point 20 in a center-proximal region.

To produce this end face geometry with the two free surface segments 32, 34, the second free surface segment 34 is initially ground with the aid of a first abrasive disc. The first free surface segment 32 is subsequently ground with the aid of a second abrasive disc of a finer grit than the abrasive disc for the second free surface segment 34. Overall, the end surface 14 is thereby ground such that the first free surface segment 32 has an average abrasiveness $R_a$ which is less than the average abrasiveness $R_a$ of the second free surface segment 34. In particular, the abrasiveness of the first free surface segment 32 is less than 0.1 μm. The average abrasiveness $R_a$ of the second free surface segment 34 is preferably above 0.1 μm, and in particular ranges between 0.1 μm and 0.4 μm.

Average abrasiveness generally denotes an arithmetic mean of the deviation of a surface point from a center line. The center line thereby intersects a surface profile of the end surface 14 such that the sum of all deviations of the surface profile on the center line is minimal.

In this description, the end face geometry was described in connection with the drill bit 2 of a modular drilling tool as depicted in Figures. The drill bit 2 is a reversibly interchangeable carbide insert. However, the end face geometry described here, or generally the specific embodiment of the first free surface segment 32 with the lower abrasiveness in comparison to the second free surface segment 34, can also be used in other rotary tools, in particular drilling tools, for example in solid carbide drills.

The term rotary tool is generally understood to describe a tool for machining workpieces which rotate around a rotation axis during a processing procedure.

While specific embodiments of the invention have been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

What is claimed is:

1. A rotary tool which extends along a longitudinal axis, said rotary tool comprising:
    an end surface;
    a brad point which lies on the longitudinal axis;
    a chisel portion which crosses through the brad point and comprises:
        a first chisel edge which generally extends from the brad point outwardly in a first radial direction; and
        a second chisel edge which generally extends from the brad point outwardly in a second radial direction, wherein the first and second chisel edges do not contact one another;
    a major cutting edge extending radially outwardly from the first chisel edge, up to an edge corner;
    the end surface comprising:
        a first free surface segment which adjoins the major cutting edge, and extends from the major cutting edge in a first circumferential direction of the rotary tool, wherein the first circumferential direction is opposite a cutting direction of the rotary tool; and
        a second free surface segment which in turn:
            adjoins the first free surface segment and the major cutting edge; and
            extends from the first free surface segment and the major cutting edge in the first circumferential direction of the rotary tool,
        wherein the first free surface segment has a lower average abrasiveness than the second free surface segment.

2. The rotary tool of claim 1, wherein the average abrasiveness of the first free surface segment is less than or equal to 0.1 μm.

3. The rotary tool of claim 1, wherein the average abrasiveness of the second free surface segment is in the range of from greater than 0.1 μm to 0.4 μm.

4. The rotary tool of claim 1, wherein the first free surface segment begins at a distance radially outwardly from the brad point.

5. The rotary tool of claim 4, wherein the first free surface segment extends over a radial length that is between 50% and 90% of a nominal radius of the rotary tool.

6. The rotary tool according to claim 1, wherein the first free surface segment adjoins the major cutting edge at a distance from the first chisel edge, as seen in a radial direction of the rotary tool.

7. The rotary tool according to claim 1, wherein the first free surface segment has a width in the circumferential direction, the width increasing in a radially outward direction towards the edge corner.

8. The rotary tool according to claim 1, wherein the first free surface segment on the edge corner extends across an angle in the range from 5° to 20° in the circumferential direction.

9. A method for manufacturing a rotary tool as recited in claim 1, wherein the first free surface segment and the second free surface segment are ground with different abrasive discs.

10. The method of claim 9, wherein the abrasive discs have a different grit.

11. The method of claim 9, wherein the second free surface segment is ground first, with the first free surface segment being ground thereafter.

12. The rotary tool of claim 1, wherein the chisel portion travels approximately in an S-shape in crossing through the brad point.

13. The rotary tool of claim 1, wherein the major cutting edge comprises:
    a center-proximal sub-segment which extends radially outwardly from the first chisel edge; and
    a center-distal sub-segment which extends radially outwardly from the center-proximal sub-segment to the edge corners;
    wherein the second free surface segment extends from the first free surface segment and from the center-proximal sub-segment of the major cutting edge, in the first circumferential direction of the rotary tool.

14. The rotary tool of claim 13, wherein the first free surface segment extends solely from the center-distal sub-segment of the major cutting edge, in the first circumferential direction of the rotary tool.

15. The rotary tool of claim 14, comprising:
a flute which extends generally in a longitudinal direction of the rotary tool;
a point thinning portion which extends from the second free surface segment to the flute.

16. The rotary tool of claim 1, wherein the first free surface segment extends over a radial length that is between 50% and 90% of a nominal radius of the rotary tool.

17. The rotary tool of claim 1, comprising:
a flute which extends generally in a longitudinal direction of the rotary tool, and which is disposed adjacent the major cutting edge;
a minor cutting edge which extends from the edge corner and travels along the flute; and
a support bevel which extends from the minor cutting edge in the first circumferential direction of the rotary tool.

18. The rotary tool of claim 1, comprising:
a base body; and
an exchangeable drill bit which is insertable into the base body;
wherein the exchangeable drill bit includes the end surface, the brad point, the chisel portion and the major cutting edge.

19. The rotary tool of claim 18, wherein:
the base body comprises at least one flute; and
the exchangeable drill bit includes at least one flute portion which adjoins the at least one flute of the fluted base body, when the exchangeable drill bit is inserted into the fluted base body.

20. The rotary tool of claim 19, wherein the exchangeable drill bit comprises:
a first flute portion which extends generally in a longitudinal direction of the exchangeable drill bit and which adjoins a first flute of the fluted base body, when the exchangeable drill bit is inserted into the fluted base body;
a second flute portion which extends generally in a longitudinal direction of the exchangeable drill bit and which adjoins a second flute of the fluted base body, when the exchangeable drill bit is inserted into the fluted base body;
a point thinning portion which extends from the second free surface segment to the first flute portion; and
a minor cutting edge which extends from the edge corner and travels along the second flute portion; and
a support bevel which extends from the minor cutting edge in the first circumferential direction of the rotary tool.

* * * * *